United States Patent
Ferlitsch

(10) Patent No.: US 8,253,951 B2
(45) Date of Patent: Aug. 28, 2012

(54) SYSTEMS AND METHODS FOR DETERMINING WHEN TO DOWNLOAD A RESOURCE TO A PRINTING DEVICE AS PART OF A PRINT JOB

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1167 days.

(21) Appl. No.: 10/864,979

(22) Filed: Jun. 10, 2004

(65) Prior Publication Data

US 2005/0275861 A1   Dec. 15, 2005

(51) Int. Cl.
*G06F 3/12* (2006.01)
*G06K 15/00* (2006.01)

(52) U.S. Cl. ............... 358/1.13; 358/1.16; 358/1.15; 358/1.14

(58) Field of Classification Search .................. None
See application file for complete search history.

(56) References Cited

U.S. PATENT DOCUMENTS

| | | | |
|---|---|---|---|
| 5,113,355 A * | 5/1992 | Nomura | 358/1.11 |
| 5,239,621 A | 8/1993 | Brown, III et al. | |
| 5,446,837 A | 8/1995 | Motoyama et al. | |
| 5,729,666 A | 3/1998 | Konsella et al. | |
| 5,940,581 A | 8/1999 | Lipton | |
| 6,252,671 B1 | 6/2001 | Peng et al. | |
| 6,452,692 B1 * | 9/2002 | Yacoub | 358/1.15 |
| 6,609,843 B2 | 8/2003 | Mahoney et al. | |
| 7,589,849 B2 * | 9/2009 | Carney et al. | 358/1.15 |
| 2001/0054088 A1 | 12/2001 | Naito et al. | |
| 2003/0011816 A1 | 1/2003 | Ikeno | |
| 2003/0090704 A1 | 5/2003 | Hansen | |
| 2003/0142333 A1 * | 7/2003 | Nguyen et al. | 358/1.11 |
| 2003/0191790 A1 | 10/2003 | Horiyama | |

FOREIGN PATENT DOCUMENTS

| | | |
|---|---|---|
| JP | 08-329058 | 12/1996 |
| JP | 09-254459 | 9/1997 |
| JP | 2000-112698 | 4/2000 |
| JP | 2001-222186 | 8/2001 |
| JP | 2003-015850 | 1/2003 |
| JP | 2003-029941 | 1/2003 |
| WO | 01/77807 | 10/2001 |

* cited by examiner

*Primary Examiner* — Twyler Haskins
*Assistant Examiner* — Marcus T Riley
(74) *Attorney, Agent, or Firm* — Austin Rapp & Hardman

(57) ABSTRACT

Systems and methods for determining when to download a resource to a printing device as part of a print job are disclosed. An exemplary system includes a computing device. The computing device includes a processor and memory in electronic communication with the processor. Instructions are stored in the memory. The instructions are executable to implement a method that involves generating a print job for a printing device. The method also involves generating a resource index. The resource index includes a list of at least one resource referenced in the print job. The method also involves associating the resource index with the print job. The method also involves spooling the print job.

39 Claims, 10 Drawing Sheets

SYSTEMS AND METHODS FOR DETERMINING WHEN TO DOWNLOAD A RESOURCE TO A PRINTING DEVICE AS PART OF A PRINT JOB

TECHNICAL FIELD

The present invention relates generally to printing devices. More specifically, the present invention relates to systems and methods for determining when to download a resource to a printing device as part of a print job.

BACKGROUND

Printing devices are frequently used in many aspects of business, industry and academic endeavors. The term "printing," as used herein, should be interpreted broadly to include any process for producing a copy of a document onto paper, a computer screen, an electronic image, or the like. Examples of printing devices include printers, facsimile devices, copiers, scanners, display monitors, multi-function peripherals (MFPs), imagesetters, platesetters, and so forth. Documents which are sent to a printing device for printing are sometimes referred to as print jobs. Print jobs may include references to one or more resources, such as fonts, forms, overlays, watermarks, logos, macros, biometric identifications, address books, digital signatures, etc.

A print generation process (e.g., a printer driver) may download the resources that are referenced in a print job to a printing device. For example, the resources may be embedded in the print job. Some printing devices have the ability to retain resources in non-volatile storage. If a resource is resident in a printing device, then it is not necessary for the print generation process to download the resource to the printing device. Thus, it may be desirable for a print generation process to be able to determine when to download a resource to a printing device as part of a print job.

The resources that are resident in a printing device may be fixed. A printer driver associated with such a printing device (e.g., provided by the manufacturer) may have pre-determined knowledge of which resources are resident in the printing device. If a print job contains a reference to a resource that is not part of the pre-determined list, the driver may download a copy of the resource as part of the print job. Once the print job is completed, the resource may be deleted.

However, the resources that are resident in some printing devices may not be fixed. For example, a growing number of printing devices have the ability to download resources into non-volatile storage (e.g., flash memory).

There are several known approaches for determining when to download a resource to a printing device as part of a print job. For example, one approach involves listing the device resident resources in a printer driver configuration that is stored on the host. In another approach, the printer driver dynamically determines the device resident resources of the device by querying the device at the inception of the job generation. In yet another approach, the resources resident in a printing device may be registered with a centralized resource manager, which is then queried by the print generation process when a print job is initiated. However, benefits may be realized by improved systems and methods for determining when to download a resource to a printing device as part of a print job.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
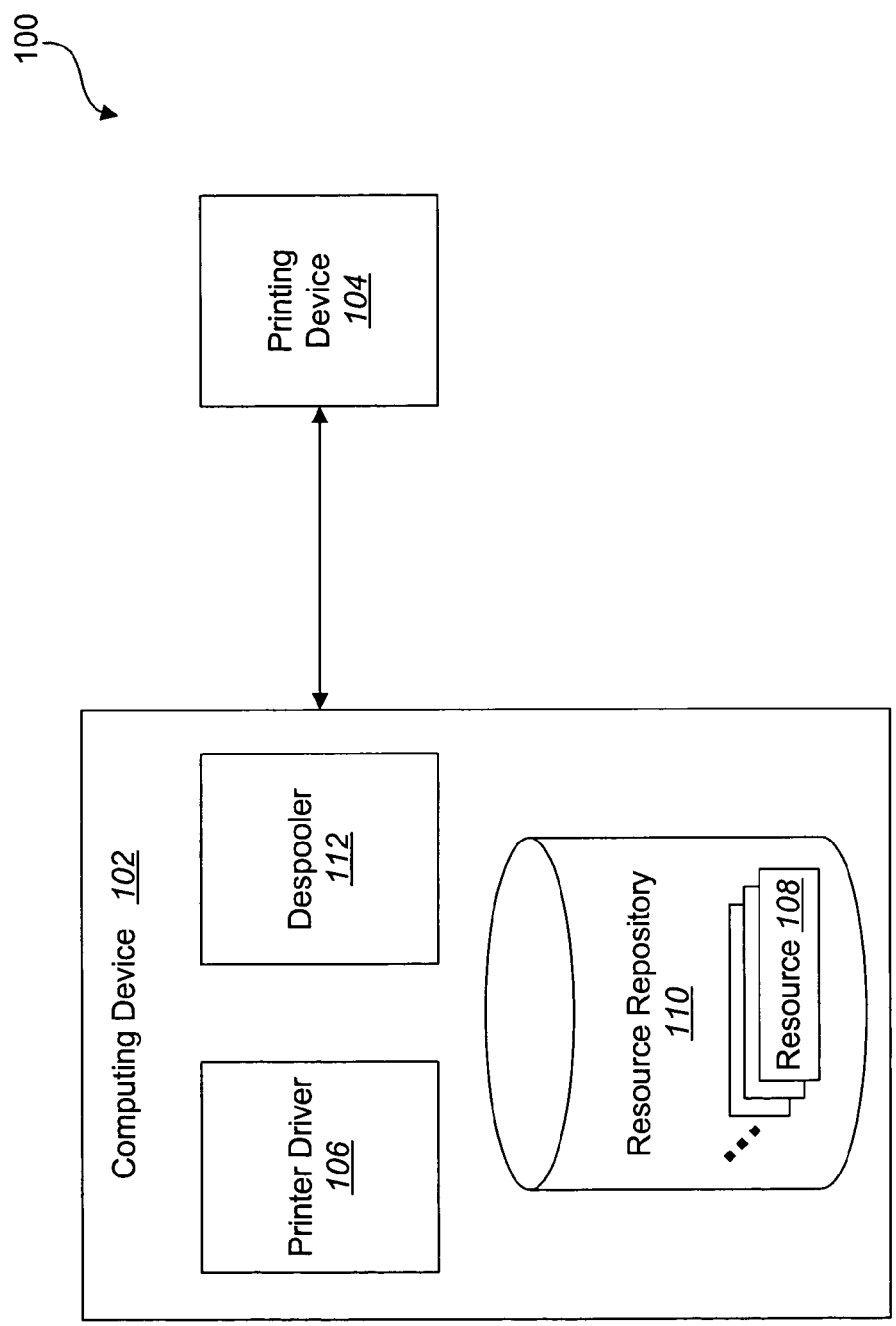
FIG. 1 illustrates an exemplary system in which some embodiments may be practiced.

A computing device is disclosed. The computing device includes a processor and memory in electronic communication with the processor. Instructions are stored in the memory. The instructions are executable to implement a method that involves generating a print job for a printing device. The method also involves generating a resource index. The resource index includes a list of at least one resource referenced in the print job. In some embodiments, the at least one resource is not embedded in the print job. The method also involves associating the resource index with the print job. The method may additionally involve registering the at least one resource with a resource repository. The method also involves spooling the print job.

In some embodiments, the printing device may be selected from the group consisting of a printer, a facsimile device, a copier, a scanner, a display monitor, an imagesetter, a platesetter, an image store, and a multi-function peripheral device. Also, in some embodiments, the at least one resource may be selected from the group consisting of a font, a form, an overlay, a watermark, a logo, a macro, a biometric identification, an address book, and a digital signature.

In some embodiments, the method may also involve locating the resource index associated with the spooled print job. This may involve recognizing an identifier in the print job. The method may also involve determining whether the at least one resource listed in the resource index is resident in the printing device. This may involve querying the printing device Alternatively, this may involve querying a centralized resource manager. If the at least one resource is not resident in the printing device, the method may also involve obtaining the at least one resource from the resource repository and sending the at least one resource to the printing device.

Sending the at least one resource to the printing device may involve embedding the at least one resource in the print job. Embedding the at least one resource in the print job may involve determining a location for the at least one resource in the print job that does not conflict with any instructions in the print job. Alternatively, sending the at least one resource to the printing device may involve embedding a link to the at least one resource in the print job.

In some embodiments, associating the resource index with the print job involves prepending the resource index to the print job. Alternatively, associating the resource index with the print job may involve appending the resource index to the print job. Alternatively still, associating the resource index with the print job may involve embedding a link to the resource index in the print job.

A print server is also disclosed. The print server includes a processor and memory in electronic communication with the processor. Instructions are stored in the memory. The instructions are executable to implement a method that involves receiving a print job from a computing device. The method also involves locating a resource index that comprises a list of at least one resource referenced in the print job. The method also involves determining whether the at least one resource listed in the resource index is resident in a printing device. If the at least one resource is not resident in the printing device, the method also involves obtaining the at least one resource from a resource repository and sending the at least one resource to the printing device.

In some embodiments, the resource repository may be located on the computing device. Alternatively, the resource repository may be a network resource repository.

A method in a computing device is also disclosed. The method involves generating a print job for a printing device. The method also involves generating a resource index. The resource index includes a list of at least one resource referenced in the print job. The method also involves associating the resource index with the print job. The method also involves spooling the print job.

A method in a print server is also disclosed. The method involves receiving a print job from a computing device. The method also involves locating a resource index that comprises a list of at least one resource referenced in the print job. The method also involves determining whether the at least one resource listed in the resource index is resident in a printing device. If the at least one resource is not resident in the printing device, the method also involves obtaining the at least one resource from a resource repository and sending the at least one resource to the printing device.

A computer-readable medium for storing program data is also disclosed. The program data includes executable instructions for implementing a method in a computing device. The method involves generating a print job for a printing device. The method also involves generating a resource index. The resource index includes a list of at least one resource referenced in the print job. The method also involves associating the resource index with the print job. The method also involves spooling the print job.

Another embodiment of a computer-readable medium for storing program data is also disclosed. The program data includes executable instructions for implementing a method in a print server. The method involves receiving a print job from a computing device. The method also involves locating a resource index that comprises a list of at least one resource referenced in the print job. The method also involves determining whether the at least one resource listed in the resource index is resident in a printing device. If the at least one resource is not resident in the printing device, the method also involves obtaining the at least one resource from a resource repository and sending the at least one resource to the printing device.

Various embodiments of the invention are now described with reference to the Figures, where like reference numbers indicate identical or functionally similar elements. It will be readily understood that the embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Several aspects of the embodiments described herein will be illustrated as software modules or components stored in a computing device. As used herein, a software module or component may include any type of computer instruction or computer executable code located within a memory device and/or transmitted as electronic signals over a system bus or network. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction, or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

Note that the exemplary embodiment is provided as an exemplar throughout this discussion, however, alternate embodiments may incorporate various aspects without departing from the scope of the present invention.

The order of the steps or actions of the methods described in connection with the embodiments disclosed herein may be changed by those skilled in the art without departing from the scope of the present invention. Thus, any order in the Figures or detailed description is for illustrative purposes only and is not meant to imply a required order.

FIG. 1 illustrates an exemplary system 100 in which some embodiments may be practiced. The system 100 includes a computing device 102. A computing device 102, as used herein, is any device that includes a digital processor capable of receiving and processing data. A computing device 102 includes the broad range of digital computers, including hand-held computers, personal computers, servers, mainframes, supercomputers, microcontrollers, and the like.

The computing device 102 is in electronic communication with a printing device 104. The term "printing," as used herein, should be interpreted broadly to include any process for producing a copy of a document onto paper, a computer screen, an electronic image, or the like. Examples of printing devices 104 include printers, facsimile devices, copiers, scanners, display monitors, multi-function peripherals (MFPs), imagesetters, platesetters, and so forth.

The computing device 102 includes a printer driver 106. The printer driver 106 generates print jobs for the printing device 104. The term print job, as used herein, should be interpreted broadly to include any set of instructions that may be processed by a printing device 104. The print jobs generated by the printer driver 106 may include references to one or more resources 108. Examples of resources 108 include fonts, forms, overlays, watermarks, logos, macros, biometric identifications, address books, digital signatures, etc.

Where a print job generated by the printer driver 108 includes a reference to one or more resources 108, the printer driver 106 does not embed the resources 108 into the print job at the time of job generation. Instead, the printer driver 106 registers the resources 108 with a local resource repository 110. This may include placing copies of the resources 108 into the repository 110, if they are not already stored in the repository 110. The resource repository 110 may be implemented by any means, such as a database, a file, a directory/file layout, sub-keys in the system registry, and so forth.

In addition to registering resources 108 with the repository 110, the printer driver 106 also creates a resource index (not shown in FIG. 1). The resource index contains a list of each resource 108 that is referenced by the print job. The printer driver 106 associates the resource index with the print job, and then spools the print job to a print spooler.

The determination of which resources 108 are to be downloaded to the printing device 104 is deferred until a despooler 112 initiates the delivery of the print job to the printing device 104. Prior to sending the print job to the printing device 104, the despooler 112 locates the resource index associated with the print job. For each resource 108 listed in the resource index, the despooler 112 determines if the resource 108 is resident in the printing device 104. For each resource 108 that is not resident in the printing device 104, the despooler 112 obtains the resource 108 from the resource repository 110 and sends the resource 108 to the printing device 104. For example, the despooler 112 may embed the resource 108 in the print job, which is then despooled to the printing device 104. The resource 108 may be compressed and/or encrypted. Alternatively, the despooler 112 may embed a link to the resource 108 in the print job. The printing device 104 may then pull the resource 108 using the link when it starts processing the print job.

Figure 2:
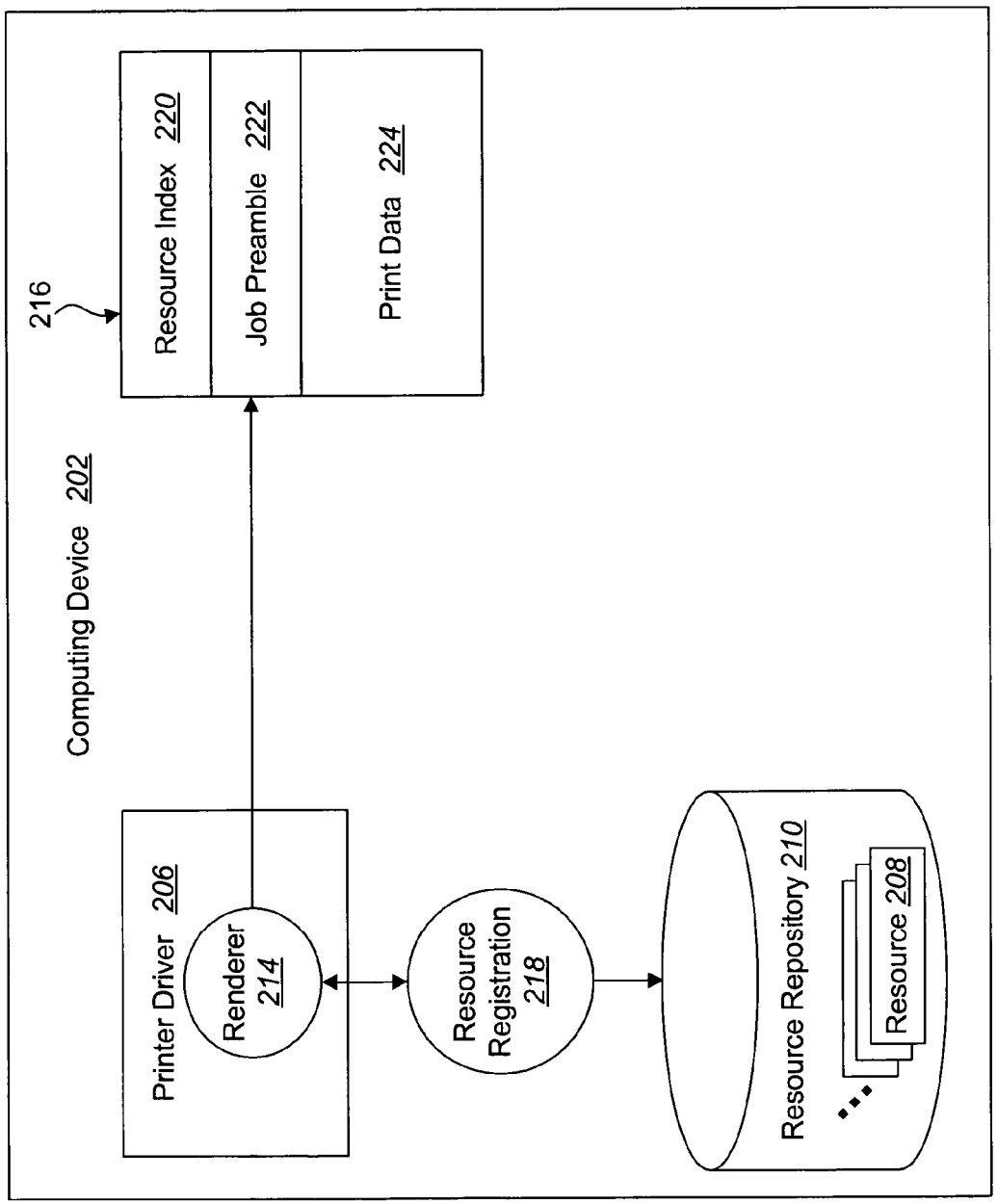
FIG. 2 illustrates an exemplary way that a printer driver may register resources with a resource repository.

FIG. 2 illustrates an exemplary way that a printer driver 206 may register resources 208 with a resource repository 210. The printer driver 206, via a renderer 214, generates a print job 216 for the printing device 104. Typically, a print job 216 includes a job preamble 222 (e.g., a Printer Job Language (PJL) header) followed by print data 224. The print data 224 may be specified in a page description language (PDL), such as Hewlett-Packard Printer Control Language (PCL), Adobe Postscript, etc.

When the printer driver 206 makes a reference to a resource 208 in a print job 216, the printer driver 206 queries the resource repository 210, via a resource registration process 216, to determine whether the resource 208 is included in the resource repository 210. If the resource 208 is not included in the resource repository 210, the printer driver 206 sends a copy of the resource 208 to the resource repository 210.

The printer driver 206 also creates a resource index 220 for the print job 216. The resource index 220 includes a list of the resources 208 that are referenced in the print job 216. In some embodiments, the printer driver 206 may have knowledge of built-in (fixed) resources 208 in the printing device 104, and filter these resources 208 from the resource index 220.

The printer driver 206 associates the resource index 220 with the print job 216. In the illustrated embodiment, the resource index 220 is prepended to the print job 216, i.e., inserted before the job preamble 222 and the print data 224.

Figure 3:
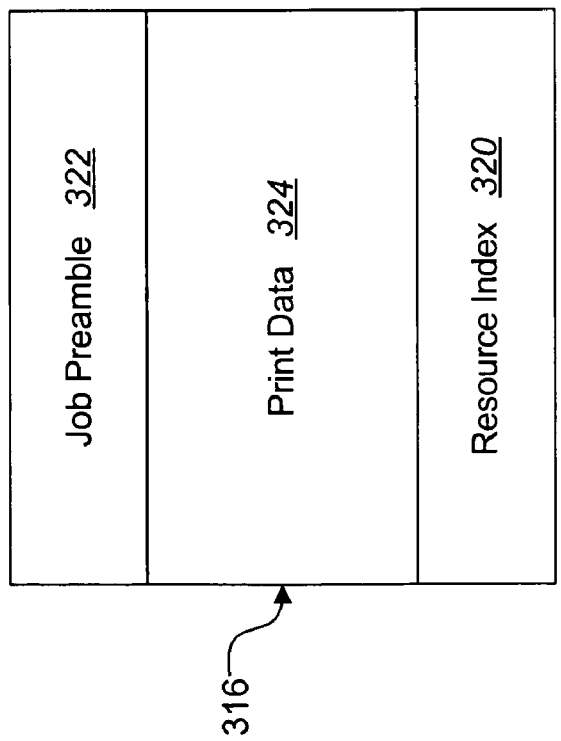
FIG. 3 illustrates an exemplary way that a resource index may be associated with a print job.

FIG. 3 illustrates another exemplary way that a resource index 320 may be associated with a print job 316. In the illustrated embodiment, the resource index 320 is appended to the print job 316, i.e., inserted after the job preamble 322 and the print data 324.

Figure 4:
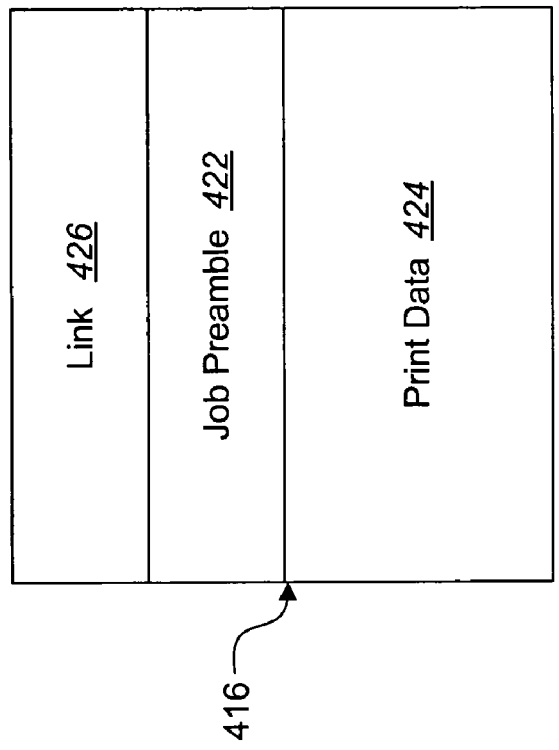
FIG. 4 illustrates another exemplary way that a resource index may be associated with a print job.

FIG. 4 illustrates another exemplary way that a resource index 220 may be associated with a print job 416. In the illustrated embodiment, a link 426 to the resource index 220 is embedded in the print job 416. Thus, in the illustrated embodiment, the resource index 220 is separate from the print job 416. In the illustrated embodiment, the link 426 is positioned in front of the job preamble 422 and the print data 424. However, the link 426 may be positioned elsewhere in the print job 416, such as appended to the end of the print job 416.

In some embodiments, if the printer driver 206 spools print data 224 as the document data is being processed (i.e., streaming), the printer driver 206 may not prepend the resource index 220, since the total resources are not known until all the document data has been processed. Instead, the printer driver 206 may either append the resource index 220 to the end of the print job 216 (as shown in FIG. 3), or embed a link 426 to the resource index 220 in the print job 216 (as shown in FIG. 4). The resource index 220 accumulates the resource 208 information as the document data is processed. However, if the printer driver 206 does not start despooling data until all the document data is processed (which is the typical case when doing non-sequential page ordering output such as booklet or reverse order printing), then the printer driver 206 may also use the method of prepending the resource index 220 to the print job 216.

Figure 5:
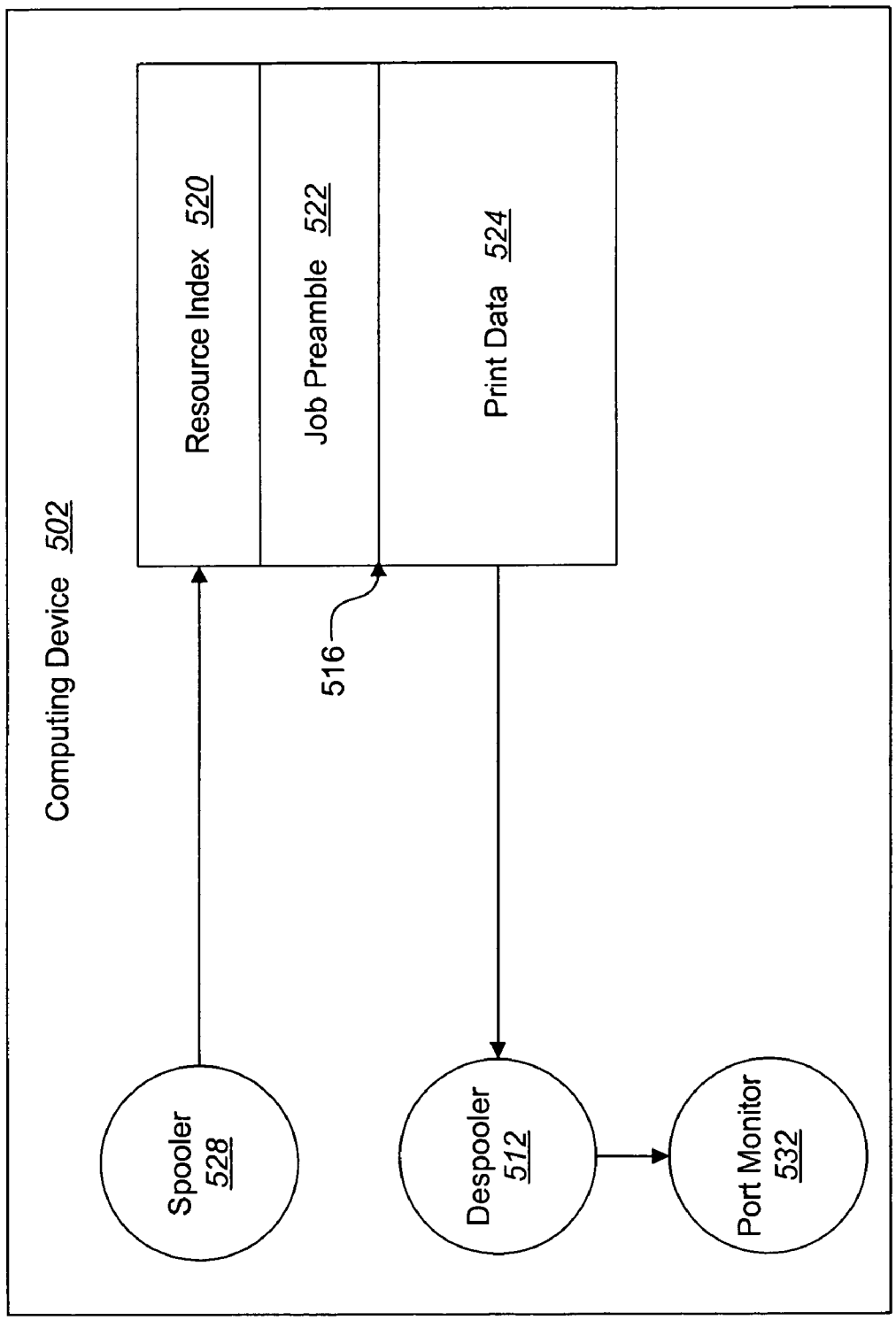
FIG. 5 illustrates an exemplary way that a computing device may process a print job after it has been generated.

FIG. 5 illustrates an exemplary way that the computing device 502 may process a print job 516 after it has been generated. After the printer driver 106 generates the print job 516, the print job 516 may be spooled and despooled through the printing subsystem of the computing device 502 in a conventional manner. For example, in the Microsoft Windows® family of operating systems, the print job 516 is spooled to a print spooler 528. The print spooler 528, either immediately or after some delay, despools the print job 516 to a despooler 512. The despooler 512 may be a print processor that is associated with the installed printing device 104. If the print data 524 is raw (i.e., rendered into printer ready data), the print processor, after performing any custom operations, despools the print job 516 to the port monitor 532 associated with the installed printing device 104. The port monitor 532 opens a connection to the printing device 104, and sends the print job 516 to the printing device 104 using any suitable transport mechanism (e.g., LPR over TCP/IP). In other embodiments, the print job 516 may be despooled to a print server which is managing the print jobs to the printing device 104 (e.g., network printer), and the print spooler (not shown) on the print server subsequently despools the print job 516 to the printing device 104.

Figure 6:
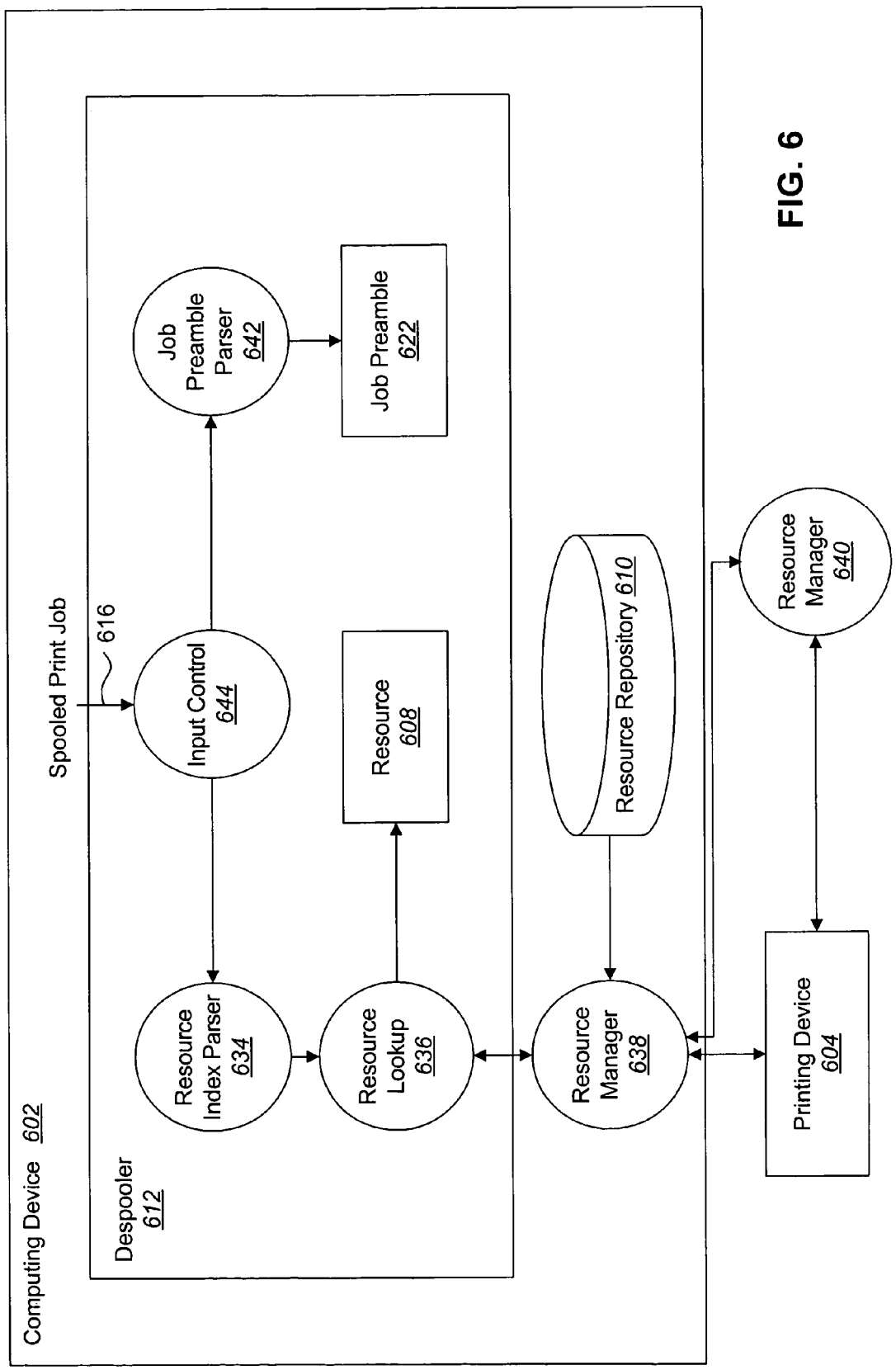
FIG. 6 illustrates exemplary operation of a despooler.

FIG. 6 illustrates exemplary operation of the despooler 612. In the illustrated embodiment, the despooler 612, via an input controller 644, receives the spooled print job 616. The despooler 612 analyzes the print job 616 to locate the resource index 220. This may occur after a connection has been established with the printing device 604, in order to ensure that the device resident resources 608 are consistent with the print job 616 at the time the print job 616 is despooled to the printing device 604.

There are a number of ways that the despooler 612 may locate the resource index 220. For example, locating the resource index 220 may involve recognizing a resource index identifier (e.g., &RI) within the print job 616.

The resource index identifier may be located in a number of places within the print job 616. For example, where the resource index 220 has been prepended to the print job 616, the resource index identifier may be located at the beginning of the print job 616. Alternatively, where the resource index 220 has been appended to the print job 616, the resource index identifier may be located at the end of the print job 616. Alternatively still, where a link 426 to the resource index 220 is embedded in the print job 616, the link 426 may be preceded (or followed) by a resource index identifier. The despooler 612 may resolve the link 426 to access the resource index 220.

The resource index identifier may be preceded (or followed, as appropriate) by size information about the resource index 220. The size information may include the size of the resource index 220, or alternatively, the number of entries in the resource index 220 (from which the size may be determined).

The resource index 220 may be formatted according to a standard format which can be parsed by the despooler 612. A resource index parser 634 parses each entry in the resource index 220. For each resource 608 that is listed in the resource index 220, the resource index parser 634 issues a resource lookup 636. The resource lookup 636 queries a resource manager 638 residing on the client computing device 602. The resource manager 638 may either be part of the despooler 612 or an external process (as shown in FIG. 6). The resource manager 638 then determines if the specified resource(s) 608 is resident in the printing device 604. There are a number of ways that the resource manager 638 may determine this. For example, the resource manager 638 may query the printing device 604 (e.g., via an SNMP request to a device dependent Resource MIB). Alternatively, the resource manager 638 may query a centralized resource manager 640 that is in electronic communication with the printing device 604.

For each resource 608 that is listed in the resource index 220 but that is not resident in the printing device 604, the resource manager 638 obtains the resource 608 from the local resource repository 610 and passes back the resource 608 to the resource lookup process 636. The resource lookup process 636 then accumulates the resources 608 to be sent to the printing device 604.

The despooler 612 also includes a job preamble parser 642 which analyzes the print job 616 to locate the job preamble 622. There are a number of ways that the job preamble parser 642 may locate the job preamble 622. For example, the job preamble parser 624 may assume that the job preamble 622 starts at the first byte after the resource index 220 (or the link 426 to the resource index 220). Alternatively, there may be a link to the job preamble 222 embedded in the resource index 220. Alternatively still, the job preamble parser 624 may locate a special job initiation sequence (e.g., <Esc>%-12345X).

The job preamble parser 642 then parses the job preamble 622 to locate the end of the job preamble 622. There are a number of ways that the job preamble parser 642 may accomplish this. For example, the job preamble parser 642 may locate a special page data initiation sequence (e.g., @PJL ENTER LANGUAGE=<PDL>).

In some embodiments, the functions that are shown in FIG. 6 as being performed by the despooler 612 may be performed by the port monitor 532. Alternatively, the functions of the despooler 612 may be performed by a language monitor. Alternatively still, the functions of the despooler 612 may be performed by a print processor, after opening a connection to the printing device 604 via the port monitor 532 (i.e., Print Spooler API StartDocPrinter( )).

Figure 7:
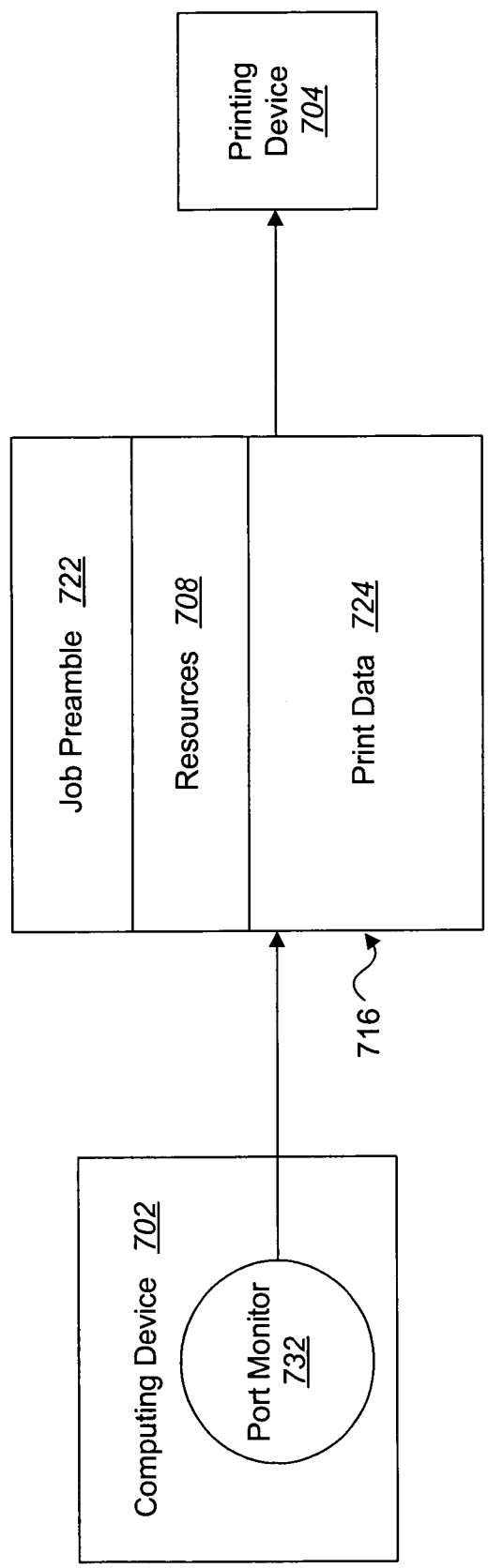
FIG. 7 illustrates an exemplary way that a print job may be despooled to a printing device.

FIG. 7 illustrates an exemplary way that a print job 716 may be despooled to a printing device 704. Once the job preamble 722 has been located and the resources 708 to be sent to the printing device 704 have been obtained, the despooler 512 or port monitor 732 removes the resource index 220 (or link 426) from the print job 716. The despooler 512 or port monitor 732 may also embed the resources 708 in the print job 716, as shown in FIG. 7. The resources 708 may be compressed and/or encrypted. In the illustrated embodiment, the resources 708 are embedded between the job preamble 722 and the print data 724. Of course, the resources 708 may be positioned elsewhere in the print job 716.

In some embodiments, the embedded resources 708 are in a format compatible with the format of the print data 724. For example, if the print data 724 is in the PCL format, the resources 708 may be in the PCL format.

An analysis may occur to determine whether the location of the embedded resources 708 would conflict with any instructions in the print job 716. For example, a PCL printer escape (<Esc>E) may cause the downloaded resources 708 to be purged. If such sequences occur in the print data 724, the resources 708 may be inserted after such sequences.

In alternative embodiments, the despooler 512 or port monitor 732 may embed link(s) to the resources 708 in the print job 716. In such embodiments, the printing device 704 may pull the resources 708 using the link(s) when it starts processing the print job 716.

Figure 8:
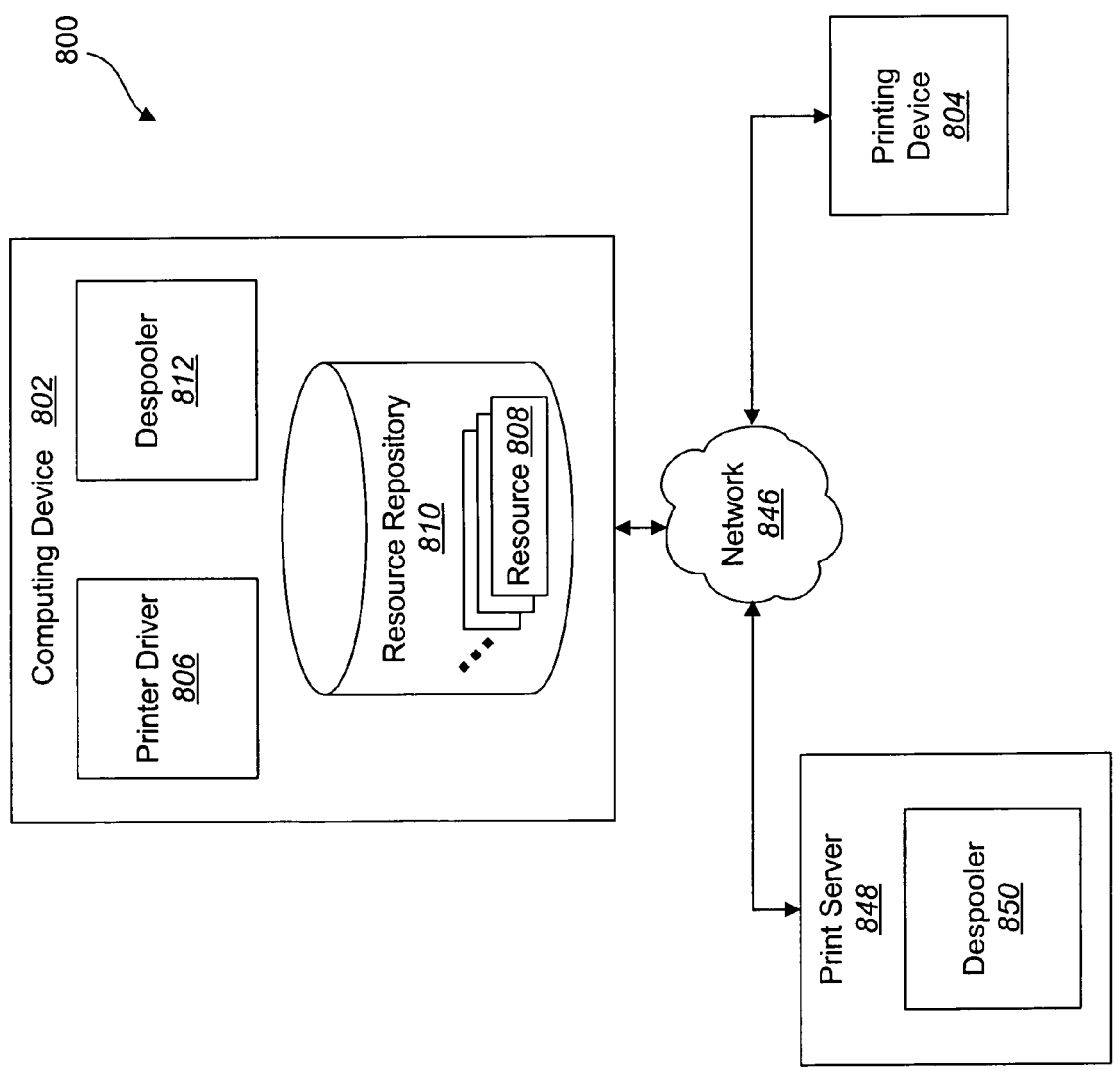
FIG. 8 illustrates an alternative system in which some embodiments may be practiced.

FIG. 8 illustrates an alternative system 800 in which some embodiments may be practiced. The system 800 includes a computing device 802. A printer driver 806 on the computing device 802 generates print jobs 216 for a printing device 804. As before, the printer driver 806 registers any resources 808 that are referenced in a print job 216 but that may not be resident in the printing device 804 with a local resource repository 810. For each print job 216, the printer driver 806 also creates a resource index 220, which contains a list of each resource 808 that is referenced in the print job 216.

In the illustrated embodiment, however, the despooler 812 on the computing device 802 despools the print jobs 216 from the computing device 802 to a print server 848. The computing device 802 is in electronic communication with the print server 848 via a network 846 connection. Thus, the print server 848 facilitates network printing as in Microsoft Windows®, Novell Netware®, etc. Embodiments disclosed herein are not limited to any particular type of network 846.

A despooler 850 on the print server 848 receives spooled print jobs 216 from the computing device 802. After the despooler 850 receives a print job 216, the despooler 850 locates the resource index 220 associated with the print job 216. For each resource 808 listed in the resource index, the despooler 850 determines if the resource 808 is resident in the printing device 804. For each resource 808 that is not resident in the printing device 804, the despooler 850 obtains the resource 808 from the resource repository 810 on the computing device 802 and sends the resource 808 to the printing device 804. For example, the despooler 850 may embed the resource 808 in the print job 216, which is then despooled to the printing device 804. The resource 808 may be compressed and/or encrypted. Alternatively, the despooler 850 may embed a link to the resource 808 in the print job 216. The printing device 804 may then pull the resource 808 using the link when it starts processing the print job 216.

Figure 9:
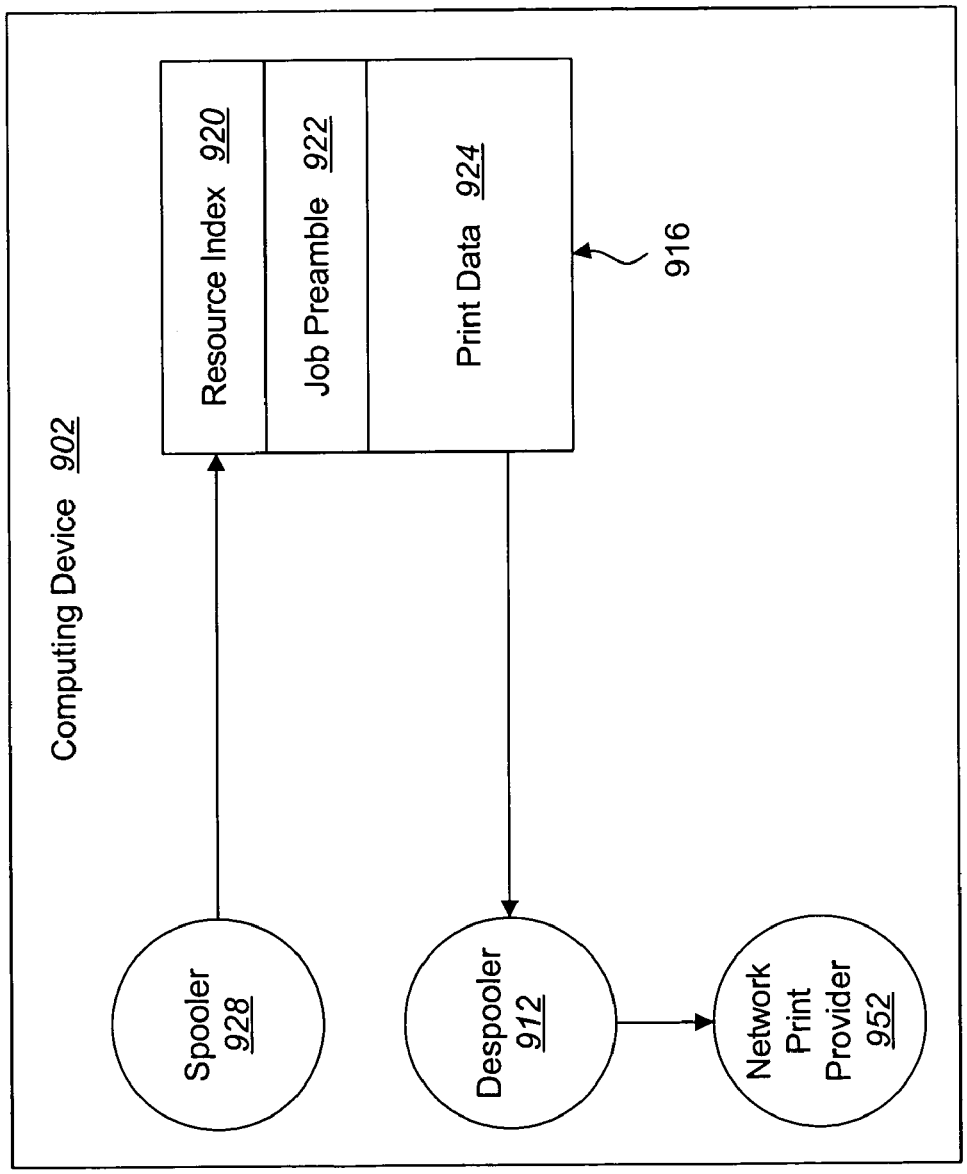
FIG. 9 illustrates another exemplary way that a computing device may process a print job after it has been generated.

FIG. 9 illustrates another exemplary way that the computing device 902 may process a print job 916 after it has been generated. After the printer driver 806 generates the print job

916, the print job 916 may be spooled to a print spooler 928. The print spooler 928, either immediately or after some delay, despools the print job 916 to a despooler 912. The despooler 912 despools the print job 916 to a network print provider 952. The network print provider 952 despools the print job 916 to the print server 848.

In the illustrated embodiment, the despooler 912 on the computing device 902 does not perform resource 808 lookup. Rather, this task is deferred to the despooler 850 on the print server 848, as described above.

In some embodiments where the print job 916 is despooled to a print server 848, the resource index 920 may indicate the location of the client computing device 902. This enables the despooler 850 on the print server 848 to determine the location of the resource repository 810 that was associated with the generation of the print job 916.

Figure 10:
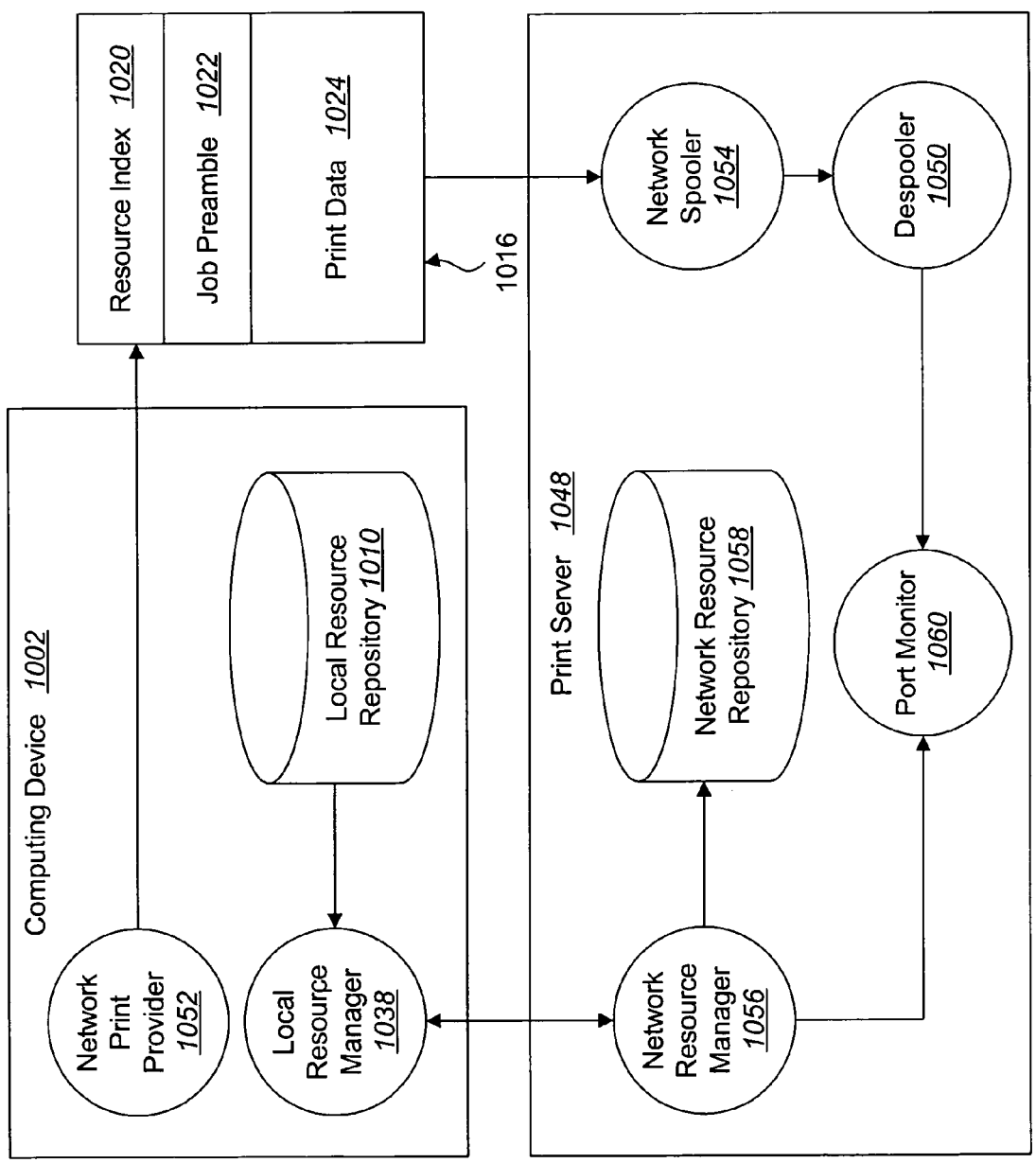
FIG. 10 illustrates exemplary operation of a despooler on a print server.

FIG. 10 illustrates exemplary operation of the despooler 1050 on the print server 1048. The network print provider 1052 on the computing device 1002 despools the print job 1016 to the print server 1048, where it is received by a network spooler 1054. The network spooler 1054 despools the print job 1016 to the despooler 1050.

The despooler 1050 locates and parses the resource index 1020 in the print job 1016. The despooler 1050 determines whether the resources 808 listed in the resource index 1020 are resident in the printing device 804. For non-resident resources, the despooler 1050 (via a network resource manager 1056) looks for copies of the resources 808 in a network resource repository 1058. Alternatively, or in addition, the despooler 1050 (via the network resource manager 1056 and a local resource manager 1038 on the computing device 1002) looks for copies of the resources 808 in the resource repository 1010 on the computing device 1002 where the print job 1016 was generated.

The despooler 1050 then sends the resources 808 to the printing device 804. For example, the despooler 1050 may embed the resources 808 in the print job 1016. The resources 808 may be compressed and/or encrypted. Alternatively, the despooler 1050 may embed link(s) to the resources 808 in the print job 1016. Once the resources 808 (or link(s) to the resources 808) have been embedded in the print job 1016, the despooler 1050 despools the print job 1016 to the port monitor 1060 associated with the printing device 804. The port monitor 1060 opens a connection to the printing device 804, and sends the print job 1016 to the printing device 804 using any suitable transport mechanism (e.g., LPR over TCP/IP).

In some embodiments, the functions that are shown in FIG. 10 as being performed by the despooler 1050 may be performed by the port monitor 1060. Alternatively, the functions of the despooler 1050 may be performed by a language monitor. Alternatively still, the functions of the despooler 1050 may be performed by a print processor, after opening a connection to the printing device 804 via the port monitor 1060 (i.e., Print Spooler API StartDocPrintero( )).

Figure 11:
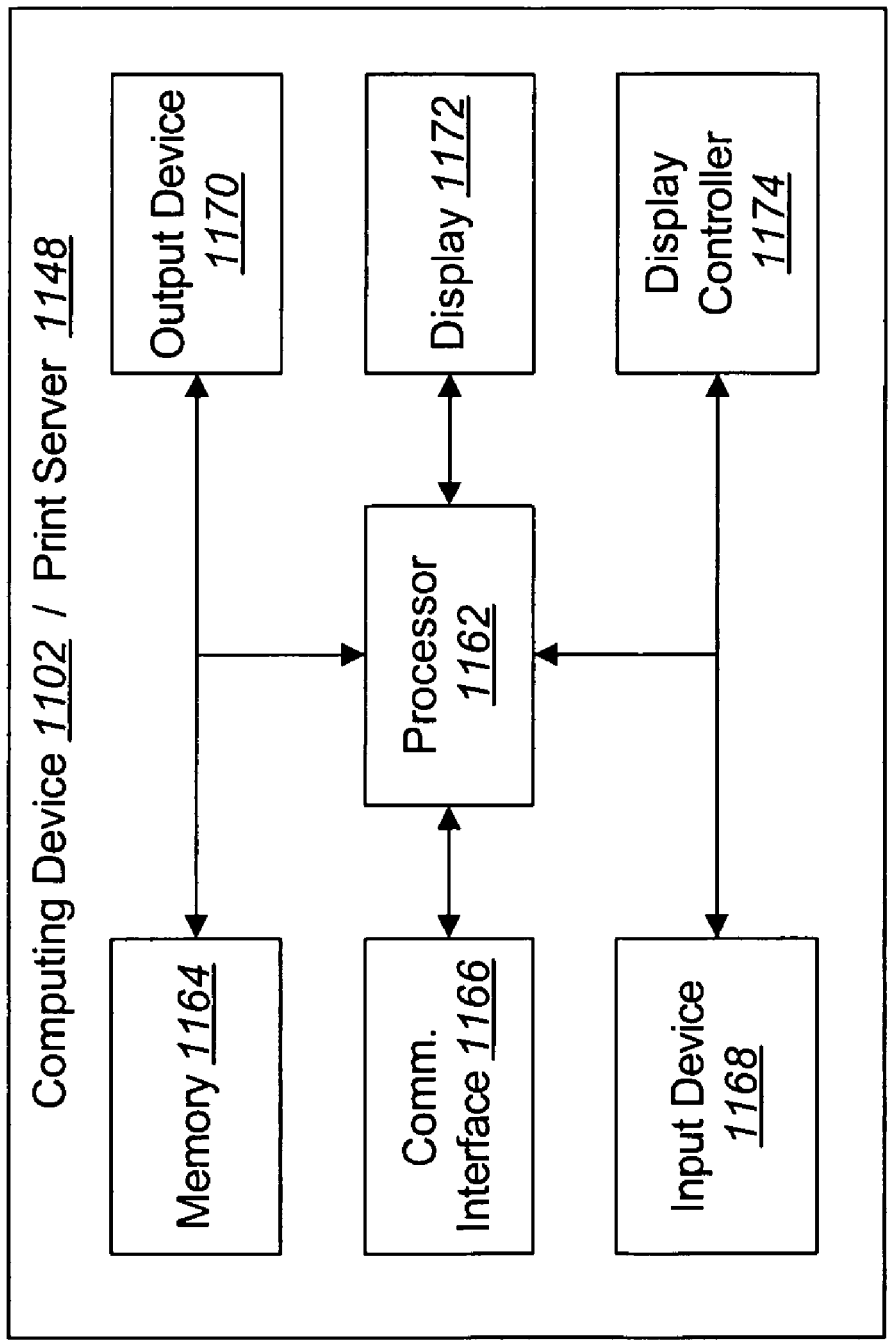
FIG. 11 is a block diagram illustrating the major hardware components typically utilized in a computing device and print server.

FIG. 11 is a block diagram illustrating the major hardware components typically utilized in a computing device 1102 and print server 1148. The illustrated components may be located within the same physical structure or in separate housings or structures.

The computing device 1102 and print server 1148 include a processor 1162 and memory 1164. The processor 1162 controls the operation of the computing device 1102 and print server 1148 and may be embodied as a microprocessor, a microcontroller, a digital signal processor (DSP) or other device known in the art. The processor 1162 typically performs logical and arithmetic operations based on program instructions stored within the memory 1164.

As used herein, the term "memory" 1164 is broadly defined as any electronic component capable of storing electronic information, and may be embodied as read only memory (ROM), random access memory (RAM), magnetic disk storage media, optical storage media, flash memory devices in RAM, on-board memory included with the processor 1162, EPROM memory, EEPROM memory, registers, etc. The memory 1164 typically stores program instructions and other types of data. The program instructions may be executed by the processor 1162 to implement some or all of the methods disclosed herein.

The computing device 1102 and print server 1148 typically also include one or more communication interfaces 1166 for communicating with other electronic devices. The communication interfaces 1166 may be based on wired communication technology, wireless communication technology, or both. Examples of different types of communication interfaces 1166 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computing device 1102 and print server 1148 typically also include one or more input devices 1168 and one or more output devices 1170. Examples of different kinds of input devices 1168 include a keyboard, mouse, microphone, remote control device, button, joystick, trackball, touchpad, lightpen, etc. Examples of different kinds of output devices 1170 include a speaker, printer, etc. One specific type of output device which is typically included in a computer system is a display device 1172. Display devices 1172 used with embodiments disclosed herein may utilize any suitable image projection technology, such as a cathode ray tube (CRT), liquid crystal display (LCD), light-emitting diode (LED), gas plasma, electroluminescence, or the like. A display controller 1174 may also be provided, for converting data stored in the memory 1164 into text, graphics, and/or moving images (as appropriate) shown on the display device 1172.

Of course, FIG. 11 illustrates only one possible configuration of the computing device 1102 and print server 1148. Those skilled in the art will recognize that various other architectures and components may be utilized. In addition, various standard components are not illustrated in order to avoid obscuring aspects of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A computing device, comprising:
    a processor;
    memory in electronic communication with the processor;
    instructions stored in the memory, the instructions being executable for:
        generating a print job for a printing device, wherein the print job comprises a job preamble and print data;
        generating a resource index that comprises a list of at least one resource referenced in the print job;
        registering the at least one resource referenced in the print job with a resource repository, wherein the resource repository is queried to determine if the at least one resource is present in the resource repository, wherein a copy of the at least one resource is placed in the resource repository and registered with the resource repository if the at least one resource is not already present in the resource repository;
        prepending or appending the resource index to the print job, wherein prepending or appending comprises inserting the resource index before or after the job preamble and the print data;
        spooling the print job;
        determining at the time of despooling whether the at least one resource listed in the resource index is resident in the printing device;
        removing the resource index from the print job; and
        if the at least one resource is not resident in the printing device, obtaining the at least one resource from the resource repository and sending by electronic communication the at least one resource to the printing device, wherein the obtaining and the sending are performed by the computing device.

2. The computing device of claim 1, wherein at least one resource is not embedded in the print job.

3. The computing device of claim 1, wherein the printing device is selected from a group consisting of a printer, a facsimile device, a copier, a scanner, a display monitor, an imagesetter, a platesetter, an image store, and a multi-function peripheral device.

4. The computing device of claim 1, wherein at least one resource is selected from a group consisting of a font, a form, an overlay, a watermark, a logo, a macro, a biometric identification, an address book, and a digital signature.

5. The computing device of claim 1, wherein the instructions are further executable for locating the resource index prepended or appended to the spooled print job.

6. The computing device of claim 5, wherein the locating of the resource index comprises recognizing an identifier in the print job.

7. The computing device of claim 5, wherein the determining whether at least one resource is resident in the printing device comprises querying the printing device.

8. The computing device of claim 5, wherein the determining whether at least one resource is resident in the printing device comprises querying a centralized resource manager.

9. The computing device of claim 5, wherein the sending by electronic communication the at least one resource to the printing device comprises embedding at least one resource in the print job.

10. The computing device of claim 5, wherein the sending by electronic communication the at least one resource to the printing device comprises embedding a link to at least one resource in the print job.

11. The computing device of claim 9, wherein the embedding of at least one resource in the print job comprises determining a location for at least one resource in the print job that does not conflict with any instructions in the print job.

12. The computing device of claim 1, wherein the instructions are further executable for despooling the print job to a print server.

13. The imaging device of claim 1, wherein the prepending or appending of the resource index to the print job comprises embedding a link to the resource index in the print job.

14. A print server, comprising:
    a processor;
    memory in electronic communication with the processor;
    instructions stored in the memory, the instructions being executable for:
        receiving a print job from a computing device, wherein the print job comprises a job preamble and print data, wherein a resource index is prepended or appended to the print job, and wherein prepending or appending comprises inserting the resource index before or after the job preamble and the print data;
        locating the resource index that comprises a list of at least one resource referenced in the print job, wherein the at least one resource is registered with a resource repository, wherein the resource repository is queried to determine if the at least one resource is present in the resource repository, and wherein the at least one resource is placed in the resource repository and registered with the resource repository if the at least one resource is not already present in the resource repository;

determining at the time of despooling whether the at least one resource listed in the resource index is resident in a printing device;

removing the resource index from the print job; and if the at least one resource is not resident in the printing device, obtaining the at least one resource from the resource repository and sending by electronic communication the at least one resource to the printing device, wherein the obtaining and the sending are performed by the print server.

15. The print server of claim 14, wherein the resource repository is located on the computing device.

16. The print server of claim 14, wherein the resource repository is a network resource repository.

17. In a computing device, a method comprising:

generating a print job for a printing device, wherein the print job comprises a job preamble and print data;

generating a resource index that comprises a list of at least one resource referenced in the print job;

registering the at least one resource referenced in the print job with a resource repository, wherein the resource repository is queried to determine if the at least one resource is present in the resource repository, wherein a copy of the at least one resource is placed in the resource repository and registered with the resource repository if the at least one resource is not already present in the resource repository;

prepending or appending the resource index to the print job, wherein prepending or appending comprises inserting the resource index before or after the job preamble and the print data;

spooling the print job;

determining at the time of despooling whether the at least one resource listed in the resource index is resident in the printing device;

removing the resource index from the print job; and if the at least one resource is not resident in the printing device, obtaining the at least one resource from the resource repository and sending by electronic communication the at least one resource to the printing device, wherein the obtaining and the sending are performed by the computing device.

18. The method of claim 17, further comprising locating the resource index prepended or appended to the spooled print job.

19. The method of claim 18, wherein the sending by electronic communication the at least one resource to the printing device comprises embedding at least one resource in the print job.

20. The method of claim 18, wherein the sending by electronic communication the at least one resource to the printing device comprises embedding a link to at least one resource in the print job.

21. The method of claim 17, further comprising despooling the print job to a print server.

22. In a print server, a method comprising:

receiving a print job from a computing device, wherein the print job comprises a job preamble and print data, wherein a resource index is prepended or appended to the print job, and wherein prepending or appending comprises inserting the resource index before or after the job preamble and the print data;

locating the resource index that comprises a list of at least one resource referenced in the print job, wherein the at least one resource is registered with a resource repository, wherein the resource repository is queried to determine if the at least one resource is present in the resource repository, and wherein the at least one resource is placed in the resource repository and registered with the resource repository if the at least one resource is not already present in the resource repository;

determining at the time of despooling whether the at least one resource listed in the resource index is resident in a printing device;

removing the resource index from the print job; and if the at least one resource is not resident in the printing device, obtaining the at least one resource from the resource repository and sending by electronic communication at least one resource to the printing device, wherein the obtaining and the sending are performed by the print server.

23. A non-transitory computer-readable medium for storing program data, wherein the program data comprises executable instructions for:

generating a print job for a printing device, wherein the print job comprises a job preamble and print data;

generating a resource index that comprises a list of at least one resource referenced in the print job;

registering the at least one resource referenced in the print job with a resource repository, wherein the resource repository is queried to determine if the at least one resource is present in the resource repository, wherein a copy of the at least one resource is placed in the resource repository and registered with the resource repository if the at least one resource is not already present in the resource repository;

prepending or appending the resource index to the print job, wherein prepending or appending comprises inserting the resource index before or after the job preamble and the print data;

spooling the print job;

determining at the time of despooling whether the at least one resource listed in the resource index is resident in the printing device;

removing the resource index from the print job; and if the at least one resource is not resident in the printing device, obtaining the at least one resource from the resource repository and sending by electronic communication the at least one resource to the printing device, wherein the obtaining and the sending are performed by a computing device.

24. The computer-readable medium of claim 23, wherein the instructions are further executable for locating the resource index appended or prepended to the spooled print job.

25. The computer-readable medium of claim 24, wherein the sending by electronic communication the at least one resource to the printing device comprises embedding at least one resource in the print job.

26. The computer-readable medium of claim 24, wherein the sending by electronic communication the at least one resource to the printing device comprises embedding a link to at least one resource in the print job.

27. The computer-readable medium of claim 23, wherein the instructions are further executable for despooling the print job to a print server.

28. A non-transitory computer-readable medium for storing program data, wherein the program data comprises executable instructions for:

receiving a print job from a computing device, wherein the print job comprises a job preamble and print data, wherein a resource index is prepended or appended to the print job, and wherein prepending or appending comprises inserting the resource index before or after the job preamble and the print data;

locating the resource index that comprises a list of at least one resource referenced in the print job, wherein the at least one resource is registered with a resource repository, wherein the resource repository is queried to determine if the at least one resource is present in the resource repository, and wherein the at least one resource is placed in the resource repository and registered with the resource repository if the at least one resource is not already present in the resource repository;

determining at the time of despooling whether the at least one resource listed in the resource index is resident in a printing device;

removing the resource index from the print job; and if the at least one resource is not resident in the printing device, obtaining the at least one resource from the resource repository and sending by electronic communication the at least one resource to the printing device, wherein the obtaining and the sending are performed by a computing device.

29. The computing device of claim 1, wherein the resource repository is implemented by one selected from a group consisting of a database, a file, a directory/file layout, and subkeys in a system registry.

30. The computing device of claim 1, wherein the at least one resource is encrypted and compressed before being sent by electronic communication to the printing device.

31. The computing device of claim 1, wherein the job preamble is a Printer Job Language (PJL) header, and wherein the print data is specified in a page description language (PDL).

32. The computing device of claim 1, wherein the determining, the removing, the obtaining, and the sending are performed by a port monitor or a language monitor.

33. The computing device of claim 1, wherein the instructions are further executable for registering the at least one resource referenced in the print job with a second resource repository.

34. The computing device of claim 33, wherein the resource repository is located on the computing device and the second resource repository is external to the computing device and is in electronic communication via a network.

35. The computing device of claim 34, wherein if the at least one resource is not already present in the resource repository, the second repository is queried to determine if the at least one resource is present in the second resource repository, wherein the at least one resource is placed in the second resource repository if the at least one resource is not already present in the second resource repository.

36. The computing device of claim 6, wherein the identifier is preceded or followed by information about the resource index.

37. The computing device of claim 8, wherein the centralized resource manager is in electronic communication with a network resource manager, wherein the network resource manager is external to the computing device.

38. The computing device of claim 37, wherein the network resource manager is coupled to a network resource repository.

39. The computing device of claim 38, wherein the network resource repository comprises at least one resource.

\* \* \* \* \*